(12) United States Patent
Ren

(10) Patent No.: US 10,445,482 B2
(45) Date of Patent: Oct. 15, 2019

(54) IDENTITY AUTHENTICATION METHOD, IDENTITY AUTHENTICATION DEVICE, AND TERMINAL

(71) Applicant: Tencent Technology (Shenzhen) Company Limited, Shenzhen, Guangdong (CN)

(72) Inventor: Jie Ren, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 211 days.

(21) Appl. No.: 15/602,836

(22) Filed: May 23, 2017

(65) Prior Publication Data

US 2017/0255767 A1 Sep. 7, 2017

Related U.S. Application Data

(63) Continuation of application No. PCT/CN2016/079287, filed on Apr. 14, 2016.

(30) Foreign Application Priority Data

Apr. 22, 2015 (CN) .......................... 2015 1 0193780

(51) Int. Cl.
*G06F 7/04* (2006.01)
*G06F 21/32* (2013.01)
(Continued)

(52) U.S. Cl.
CPC .......... *G06F 21/32* (2013.01); *G06F 17/5009* (2013.01); *G06K 9/00248* (2013.01);
(Continued)

(58) Field of Classification Search
CPC ................. G06F 21/32; G06F 17/5009; G06F 2221/2103; G06N 20/00; G06K 9/00302; G06K 9/00248; G06K 9/00288
(Continued)

(56) References Cited

U.S. PATENT DOCUMENTS 8,970,348 B1\* 3/2015 Evans ...................... G06K 9/00
340/5.52
9,524,441 B2 12/2016 Yu et al.
(Continued)

FOREIGN PATENT DOCUMENTS

CN 102087714 A 6/2011
CN 103259796 A 8/2013
(Continued)

OTHER PUBLICATIONS

International Search Report of the ISA for Application No. PCT/CN2016/079287, Haidian District, Beijing, dated Jul. 18, 2016.
(Continued)

*Primary Examiner* — Mohammad W Reza
(74) *Attorney, Agent, or Firm* — Harness, Dickey & Pierce, P.L.C.

(57) ABSTRACT

Disclosed are an identity authentication method, an identity authentication device and a terminal. The identity authentication method includes: providing an authentication object with prompt information configured to prompt the authentication object to make a target authentication action, where the target authentication action includes at least one of a facial expression and a head action; collecting at least one frame of image; detecting whether authentication action information of the authentication object in the at least one frame of image matches reference action information generated by a target object making the target authentication action; and determining that the authentication object passes an identity authentication in a case that the authentication action information of the authentication object matches the reference action information.

18 Claims, 7 Drawing Sheets

(51) Int. Cl.
*G06N 20/00* (2019.01)
*G06F 17/50* (2006.01)
*G06K 9/00* (2006.01)

(52) U.S. Cl.
CPC ..... *G06K 9/00288* (2013.01); *G06K 9/00302* (2013.01); *G06N 20/00* (2019.01); *G06F 2221/2103* (2013.01)

(58) Field of Classification Search
USPC .......................................................... 726/19
See application file for complete search history.

(56) References Cited

U.S. PATENT DOCUMENTS

| | | | |
|---|---|---|---|
| 9,576,121 B2 | 2/2017 | Cao | |
| 2013/0015946 A1* | 1/2013 | Lau | G07C 9/00 340/5.2 |
| 2013/0167212 A1* | 6/2013 | Azar | G06F 21/32 726/7 |
| 2014/0341445 A1 | 11/2014 | Yu et al. | |
| 2015/0026797 A1 | 1/2015 | Cao | |
| 2016/0311646 A1* | 10/2016 | Bryant | G06K 9/00288 |

FOREIGN PATENT DOCUMENTS

| | | |
|---|---|---|
| CN | 103384234 A | 11/2013 |
| CN | 103516682 A | 1/2014 |
| CN | 103745208 A | 4/2014 |
| CN | 104298909 A | 1/2015 |
| CN | 104518877 A | 4/2015 |

OTHER PUBLICATIONS

First Chinese Office Action regarding Chinese Application No. 201510193780.0 dated Apr. 17, 2019.

* cited by examiner

IDENTITY AUTHENTICATION METHOD, IDENTITY AUTHENTICATION DEVICE, AND TERMINAL

This application is a continuation of International Patent Application No. PCT/CN2016/079287, filed on Apr. 14, 2016, which claims priority to Chinese Patent Application No. 201510193780.0, titled "IDENTITY AUTHENTICATION METHOD AND IDENTITY AUTHENTICATION DEVICE", filed on Apr. 22, 2015 with the State Intellectual Property Office of the People's Republic of China, both of which are incorporated herein by reference in their entireties.

TECHNICAL FIELD

Embodiments of the present disclosure relates to the field of information security technology, and in particular, to an identity authentication method, an identity authentication device and a terminal.

BACKGROUND

Face recognition technology has become one of the commonly used techniques in identity authentication with maturing gradually.

The identity authentication method based on face recognition technology includes the following steps: an image including a face of a user is collected by a terminal; whether the collected face matches a face in a preset face library is detected; and it is determined that the user pass an identity authentication in a case that the collected face matches the face in the preset face library.

In the process of realizing embodiments according to the present disclosure, the inventors find that at least the following issues exist in the related technology. In a case that criminals steal a photo of a user and then use the photo to perform the identity authentication, the photo will pass the identity authentication in the terminal, which makes the accuracy of the identity authentication in the terminal low.

SUMMARY

In order to address the above technical issues, embodiments of the present disclosure provide an identity authentication method, an identity authentication device and a terminal. The technical solutions are described as follows.

In a first aspect, an identity authentication method is provided, the identity authentication method includes: providing an authentication object with prompt information configured to prompt the authentication object to make a target authentication action, where the target authentication action includes at least one of a facial expression and a head action; collecting at least one frame of image; detecting whether authentication action information of the authentication object in the at least one frame of image matches reference action information generated by a target object making the target authentication action; and determining that the authentication object passes an identity authentication in a case that the authentication action information of the authentication object matches the reference action information.

In a second aspect, an identity authentication device is provided, the identity authentication device includes: an information providing module, configured to provide an authentication object with prompt information configured to prompt the authentication object to make a target authentication action, where the target authentication action includes at least one of a facial expression and a head action; a first collecting module, configured to collect at least one frame of image; a detecting module, configured to detect whether authentication action information of the authentication object in the at least one frame of image matches reference action information generated by a target object making the target authentication action; and a result determining module, configured to determine that the authentication object passes an identity authentication in a case that a detection result of the detecting module indicates that the authentication action information of the authentication object matches the reference action information.

In a third aspect, a terminal is provided, the terminal includes: one or more processors; and a memory stored with one or more programs configured to be executed by the one or more processors. The one or more programs include an instruction to: provide an authentication object with prompt information configured to prompt the authentication object to make a target authentication action, where the target authentication action includes at least one of a facial expression and a head action; collect at least one frame of image; detect whether authentication action information of the authentication object in the at least one frame of image matches reference action information generated by a target object making the target authentication action; and determine that the authentication object passes an identity authentication in a case that the authentication action information of the authentication object matches the reference action information.

Advantageous effect of the technical solution provided by the embodiments of the present disclosure are described as follows. In the identity authentication, prompt information configured to prompt an authentication object to make a target authentication action is provided to the authentication object. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the authentication object is required in the process of the identity authentication, thereby improving the accuracy of the identity authentication.

BRIEF DESCRIPTION OF THE DRAWINGS

The accompany drawings used in the description of the embodiments will be described briefly as follows, so that the technical solutions according to the embodiments of the present disclosure will become more apparent. It is apparent that the accompany drawings in the following description show only some embodiments of the present disclosure. For those skilled in the art, other accompany drawings may be obtained according to these accompany drawings without any creative work.

DETAILED DESCRIPTION OF THE EMBODIMENTS

In order to illustrate the objects, technical solutions and advantages of the present disclosure more clearly, embodiments of the present disclosure will be described in detail in conjunction with the drawings.

A terminal may be a mobile phone, a tablet computer, an e-book reader, an access control monitoring device, a wearable device, an MP3 (Moving Picture Experts Group Audio Layer III) player, an MP4 (Moving Picture Experts Group Audio Layer IV) player, a portable laptop computer, a desktop computer, or the like.

The terminal has capabilities of collecting images and displaying information. In some scenarios, the terminal may be used to perform identity authentication on an authentication object. Optionally, the authentication object is a user using the terminal.

Figure 1:
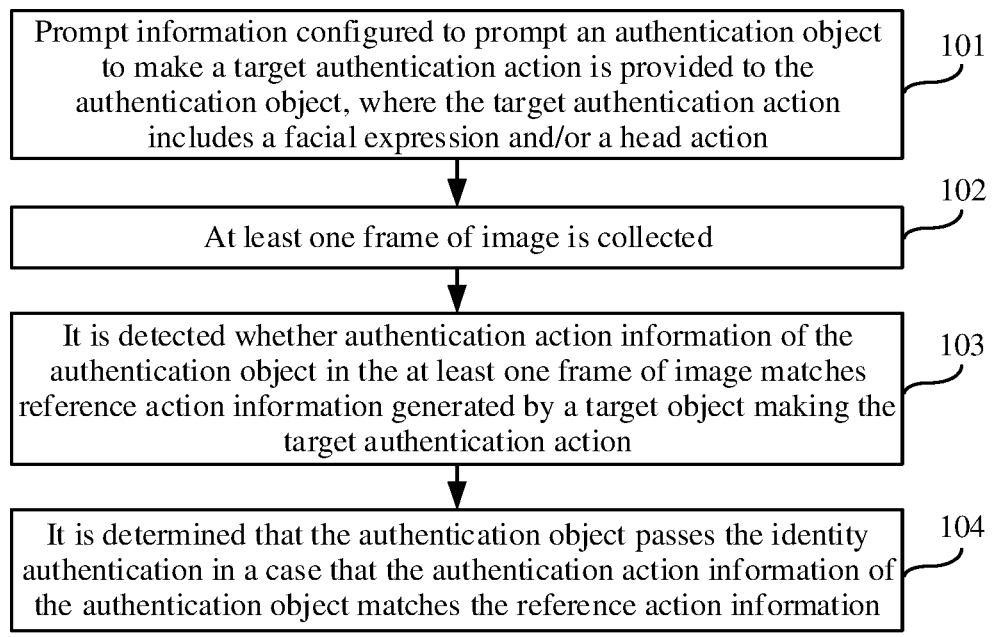
FIG. 1 is a flowchart of an identity authentication method according to an embodiment of the present disclosure.

Reference is made to FIG. 1, which is a flowchart of an identity authentication method according to an embodiment of the present disclosure. The identity authentication method may be executed by a terminal. The identity authentication method may include steps 101 to 104.

In step 101, prompt information configured to prompt an authentication object to make a target authentication action is provided to the authentication object, where the target authentication action includes a facial expression and/or a head action.

Optionally, the authentication object is a user using the electronic device.

In step 102, at least one frame of image is collected.

In step 103, it is detected whether authentication action information of the authentication object in the at least one frame of image matches reference action information generated by a target object making the target authentication action.

Optionally, the target object is a user who has passed the identity authentication. Optionally, the target object is a user who is stored at the first time or is pre-stored in the terminal. Optionally, the target object is an owner of a usage right of the terminal.

In step 104, it is determined that the authentication object passes the identity authentication in a case that the authentication action information of the authentication object matches the reference action information.

In view of the above, in the identity authentication method according to the embodiment, prompt information configured to prompt an authentication object to make a target authentication action is provided to the authentication object when performing the identity authentication. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the authentication object is required in the process of the identity authentication, thereby improving the accuracy of the identity authentication on the authentication object.

In the above embodiment, the reference action information may be information obtained by the terminal simulating based on a three-dimensional head model of the user, or information obtained by the terminal based on images collected by the terminal. Therefore, these two cases are described hereinafter in different embodiments.

Figure 2A:
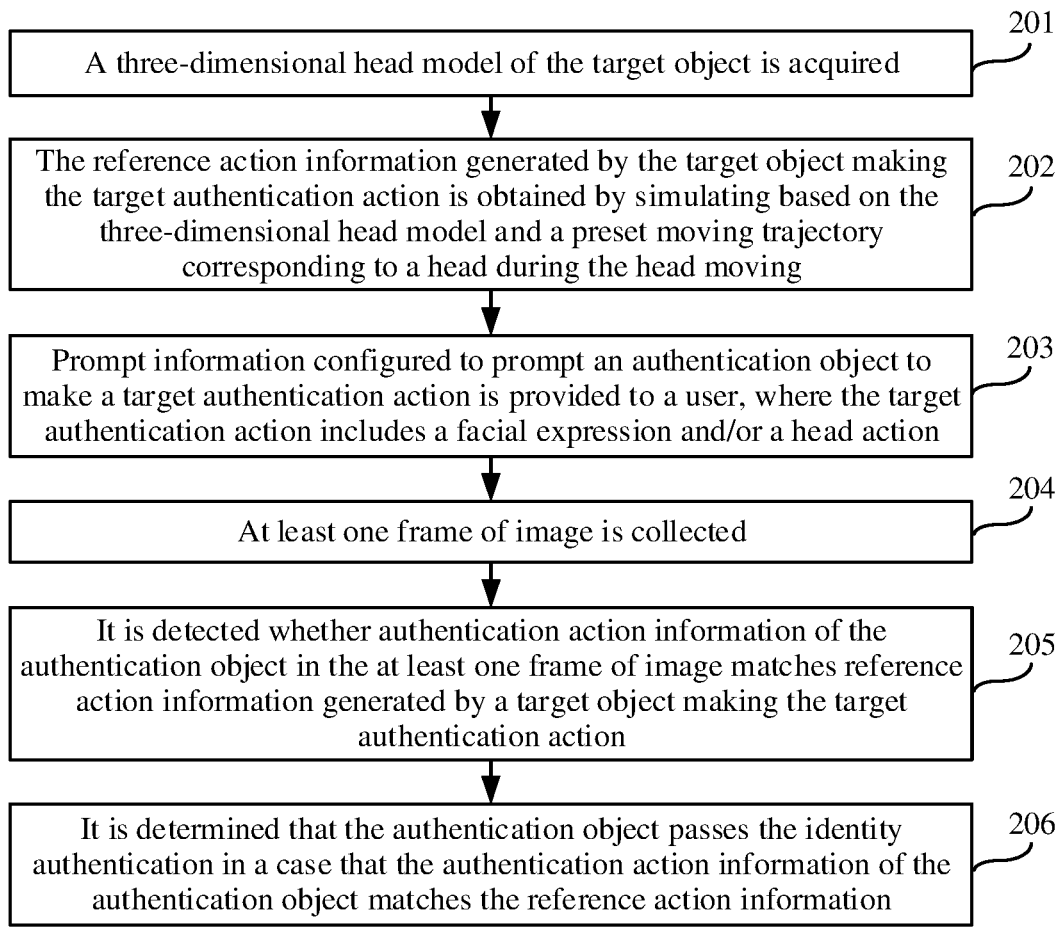
FIG. 2A is a flowchart of an identity authentication method according to an embodiment of the present disclosure.

Reference is made to FIG. 2A, which is a flowchart of an identity authentication method according to an embodiment of the present disclosure. The present embodiment is illustrated by taking a case that the reference action information is information obtained by simulating based on the three-dimensional head model as example. The identity authentication method may be executed by a terminal. As shown in FIG. 2A, the identity authentication method may include steps 201 to 206.

In step 201, a three-dimensional head model of the target object is acquired.

Optionally, the target object is a user who has passed the identity authentication. Optionally, the target object is a user who is stored at the first time or is pre-stored in the terminal. Optionally, the target object is an owner of a usage right of the terminal.

The identity authentication method according to the present embodiment can be used in a terminal, which has capabilities of collecting images and displaying information. The terminal may be a mobile phone, a tablet computer, an e-book reader or an access control monitoring device.

Optionally, step 201 may include the following two steps.

Firstly, images including the head of the target object at different angles are collected.

The terminal may collect images of the head of the user at n angles in advance. Where n angles includes angles required to construct the three-dimensional head model. Taking n=4 as an example, the terminal may collect a front image, a left image, a right image and a rear image which include the head of the user.

Optionally, the target object may stand in front of the camera of the terminal and rotate a circle. Accordingly, the terminal may collect images of the head of the target object at different angles during the rotation of the target object.

Secondly, the three-dimensional head model of the target object is obtained by training based on the collected images.

After collecting the images at n angles by the terminal, the terminal obtains the three-dimensional head model of the target object by training based on the collected images. The larger the value of n is, the more closer the three-dimensional head model obtained by the terminal by training is to the actual head model of the target object, which is not limited by the present embodiment.

In step 202, the reference action information generated by the target object making the target authentication action is obtained by simulating based on the three-dimensional head model and a preset moving trajectory corresponding to a head during the head moving.

Where the preset moving trajectory is a moving trajectory corresponding to the head movement, and may be acquired from the server and stored by the terminal in advance. The reference action information may be represented by an image and/or a feature point.

Optionally, step 202 may include the following two steps.

Firstly, feature points of the head of the target object are determined based on the three-dimensional head model.

The terminal may determine feature points of the head of the target object based on the acquired three-dimensional head model. The feature points may include but is not limited to at least one of an eyeball center point, a canthus feature point, a nostril feature point, a mouth corner feature point, an ear angle feature point, a forehead feature point and an eyebrow feature point.

Secondly, the reference action information is obtained by simulating based on the feature points and the preset moving trajectory.

The terminal simulates each authentication action made by the target object based on the feature points and the preset moving trajectory, so as to obtain the reference action information of the target object. The authentication actions include the target authentication action, and may be a facial expression or a head action of the user, or a combination of the facial expression and the head action of the user.

Take a case that the reference action information is represented by an image as an example, the terminal obtains the images of the user in cases such as laughing, being angry, being sad, pouting, lowering the head and raising the head by simulating based on facial feature points of the user and a moving trajectory of a facial muscle of the user, and the terminal stores the obtained images as the reference action information.

Take another case that the reference action information is represented by feature points as an example, the terminal obtains the feature points of the user in cases such as laughing, being angry, being sad, pouting, lowering the head and raising the head by simulating based on facial feature points of the user and a moving trajectory of a facial muscle of the user, and the terminal stores the obtained feature points as the reference action information.

In step 203, prompt information configured to prompt an authentication object to make a target authentication action is provided to the authentication object, where the target authentication action includes a facial expression and/or a head action.

In a case that the identity authentication is required to be performed on the authentication object, the terminal may provide the prompt information configured to prompt the authentication object to make the target authentication action to the authentication object. For example, referring to FIG. 2B, the access control monitoring device 21 at the entrance of a file room may provide the prompt information for prompting to smile, when a healthcare provider wants to enter the file room of a hospital after arriving at the entrance of the file room.

Optionally, step 203 may include any one of two possible implementations as follows.

In a first implementation, the prompt information is provided to the authentication object randomly; where the prompt information corresponds to at least one authentication action.

As a first possible implementation, the terminal may generate the prompt information of the authentication action corresponding to the reference action information in advance based on the obtained reference action information, and stores the generated prompt information. Thereafter, in a case that the identity authentication is required, the terminal selects randomly one piece of the prompt information from the pre-stored prompt information and provides the selected prompt information to the user. The prompt information may be a target image including the target authentication action or voice information configured to prompt to make the target authentication action.

Optionally, the prompt information has a one-to-one correspondence with the authentication action.

It should be noted that the target authentication action may be one authentication action, or two or more authentication actions.

In a second implementation, the target authentication action is acquired randomly from multiple authentication actions; the prompt information is generated based on the target authentication action; and the prompt information is provided to the authentication object.

As a second possible implementation, the terminal may determine the authentication actions based on the obtained reference action information, and store the determined authentication actions. Thereafter, in a case that the identity authentication is required to be performed on the authentication object, the terminal selects randomly the target authentication action from the pre-stored authentication actions, generates the prompt information based on the selected target authentication action and provides the prompt information to the authentication object.

Optionally, the prompt information may be a target image including the target authentication action or voice information configured to prompt to make the target authentication action.

Take the target authentication action being lowering head as an example, the terminal may generate voice information configured to prompt the authentication object to lower his head.

Optionally, manners for providing the prompt information may include but not limited to providing in at least one form of displaying an image, displaying a text, displaying both an image and a text, playing a sound, announcing by an entitative picture. For example, the step of the terminal providing the prompt information to the authentication object may include two possible implementations as follows.

In a first implementation, the target image including the target authentication action is displayed. The target image may be an image in which the target authentication action is made by the user or a cartoon image including the target authentication action made by a cartoon character, which is not limited in the present embodiment. Take a case that the target image is an image in which the user smiles as an example, a smiling face as shown in the left picture of FIG. 2C may be displayed by the terminal. Take another case that the target image is an image in which the cartoon character smiles as an example, a smiling face as shown in the right picture of FIG. 2C may be displayed by the terminal.

In a second implementation, voice information configured to prompt to make the target authentication action is played. For example, the terminal may play voice information "please lower your head for authentication".

It should be further noted that, in a case that the terminal can perform the identity authentication on multiple users, the terminal may firstly receive a user identifier entered by the user, and then provide the prompt information corresponding to the user identifier to the user. Optionally, the terminal may directly provide the prompt information, in a case that the prompt information is an image represented by a cartoon image or the prompt information is the voice information.

In step 204, at least one frame of image is collected.

Figure 2B:
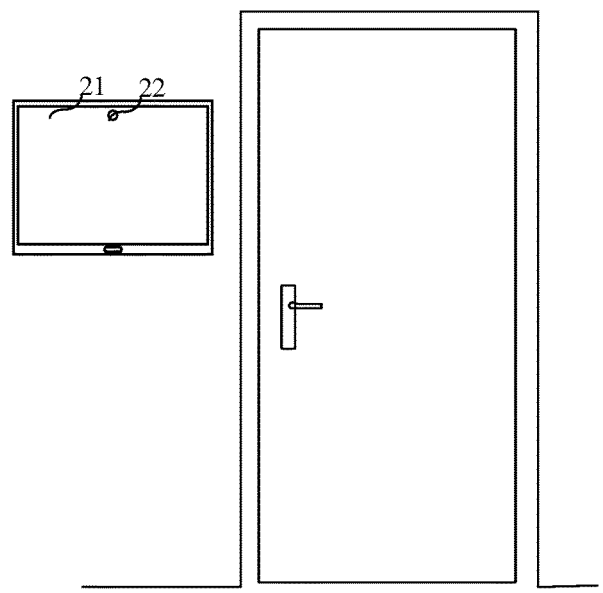
FIG. 2B is a schematic diagram of an application scenario according to an embodiment of the present disclosure.
Figure 2C:
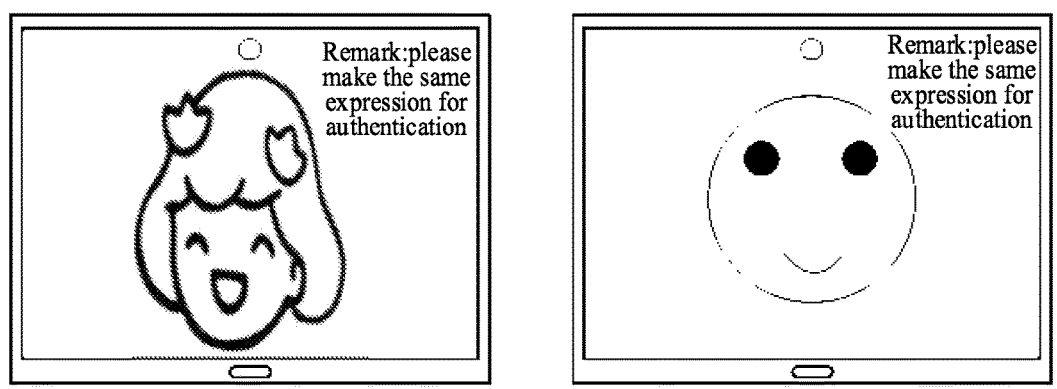
FIG. 2C is a schematic diagram of providing prompt information to a user by a terminal according to an embodiment of the present disclosure.

The terminal may be provided with a camera, as a camera 22 shown in FIG. 2B, the terminal collects at least one frame of image through the camera 22. The at least one frame of image may be a single frame of image or a video.

In step 205, it is detected whether authentication action information of the authentication object in the at least one frame of image matches reference action information generated by a target object making the target authentication action.

Optionally, the terminal may detect the similarity between the collected at least one frame of image and the reference action information. If the similarity is greater than a preset value, it is determined that the authentication action information of the authentication object matches the reference action information. Otherwise, it is determined that the authentication action information of the authentication object does not match the reference action information.

Optionally, the terminal may perform an image recognition on the at least one frame of image to recognize the head information of the authentication object in the image (the recognized information is the authentication action information of the authentication object), and then the terminal detects the similarity between the recognized information and the reference action information.

Optionally, in a case that the collected at least one frame of image includes two or more frame of images and the reference action information includes two or more pieces of reference action information, for each frame of image, the terminal calculates the similarity between the frame of image and each piece of the reference action information, and takes the greatest similarity as the similarity between the frame of image and the reference action information.

Optionally, in a case that the collected at least one frame of image includes two or more frame of images and the reference action information includes two or more pieces of reference action information, for each frame of image, the terminal calculates the similarity between the frame of image and one piece of the reference action information of multiple pieces of the reference action information based on a time order, and takes the calculated similarity as the similarity between the frame of image and the reference action information.

In step 206, it is determined that the authentication object passes the identity authentication in a case that the authentication action information of the authentication object matches the reference action information.

If the terminal detects that the authentication action information of the authentication object matches the reference action information, it means that the authentication object makes correct action according to the prompt information after the terminal provides the prompt information. In this case, the terminal may determine that the authentication object is a user with a usage right, not a photo or video or a user without the usage right, so that the authentication object can pass the identity authentication in the terminal.

Otherwise, if a detection result of the terminal indicates that the authentication action information of the authentication object does not match the reference action information, it means that the authentication object is different from the target object, and the authentication object is a user without the usage right, or is a photo or a video. In this case, the terminal can determine that the authentication object fails to pass the identity authentication. Optionally, the terminal may also display authentication failure information, and prompt the authentication object to perform the identity authentication again, which is not limited by the present embodiment.

It should be noted that the step 202 may be executed after the step 203 and before the step 205. The execution sequence of the step 202 is not limited by the embodiment of the present disclosure.

Figure 2D:
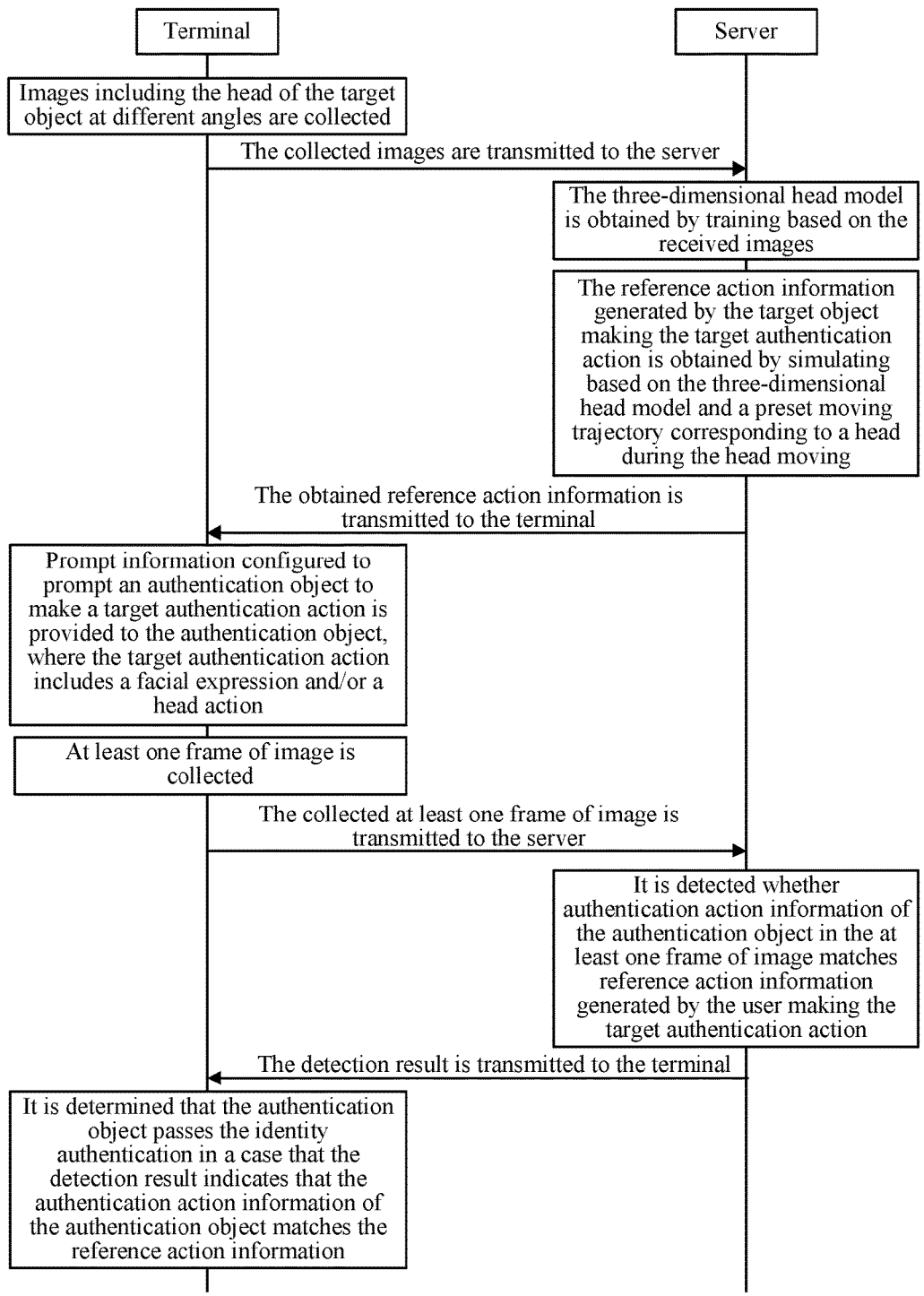
FIG. 2D is a flowchart of an identity authentication method according to an embodiment of the present disclosure.

It should be further noted that the step of training the three-dimensional head model, the step of simulating the reference action information and the step of detecting whether the authentication action information of the authentication object matches the reference action information generated by the user making the target authentication action may also be performed by the server. In this case, reference is made to FIG. 2D, which is a flowchart of the identity authentication method according to the present embodiment.

This embodiment merely takes the identity authentication method for an access control monitoring device as an example. Similarly, the identity authentication method may also be applied to a terminal such as a mobile phone, a tablet computer or an e-book reader, which is not described herein.

In view of the above, in the identity authentication method according to the embodiment, prompt information configured to prompt an authentication object to make a target authentication action is provided to the authentication object when performing the identity authentication. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the user is required in the process of the identity authentication, thereby improving the accuracy of the identity authentication on the user.

In the present embodiment, the prompt information is provided to the authentication object randomly, so that the authentication object may pass the identity authentication only after the authentication object makes the correct authentication action, criminals can not pass the identity authentication using a stolen photo of the target object, thereby improving the accuracy of the identity authentication.

Further, in the present embodiment, the authentication action is simulated through the head three-dimensional model. Therefore even the target object does not know the specific content of the authentication action before performing the identity authentication, thus improving the unpredictability of the authentication action and the accuracy of the identity authentication.

Figure 3:
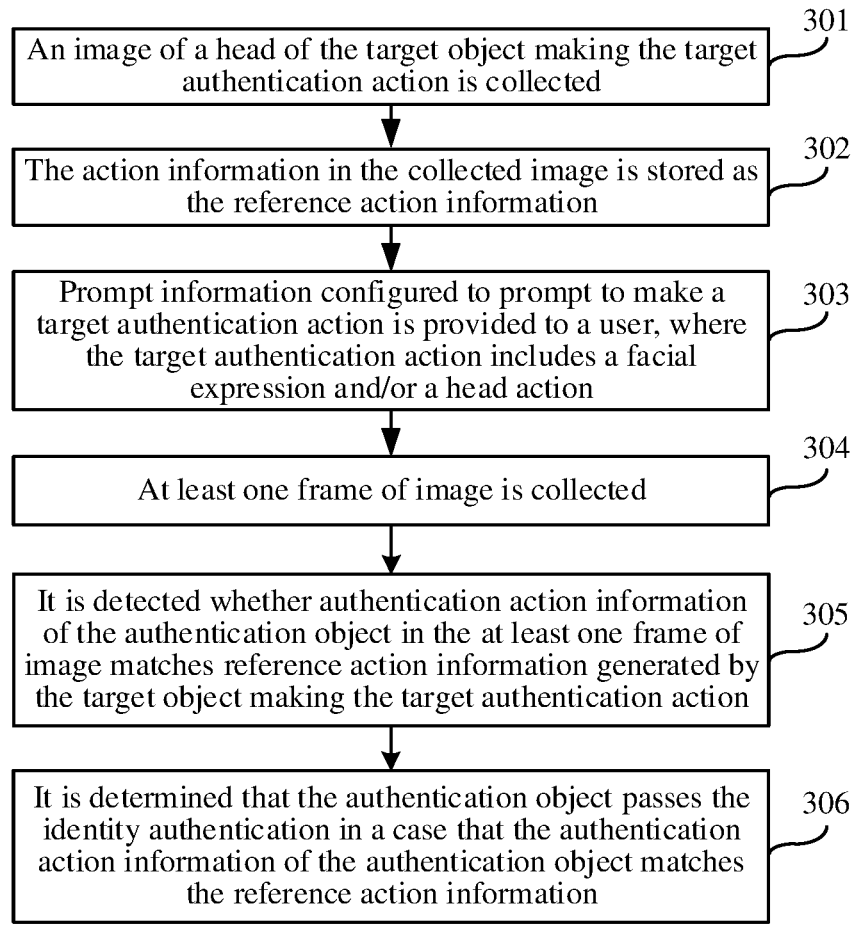
FIG. 3 is a flowchart of an identity authentication method according to an embodiment of the present disclosure.

Reference is made to FIG. 3, which is a flowchart of an identity authentication method according to an embodiment of the present disclosure. The embodiment takes a case that the reference action information is information obtained based on the collected images as an example. As shown in FIG. 3, the identity authentication method may include steps 301 to 306.

In step 301, an image of a head of the target object making the target authentication action is collected.

The identity authentication method according to the present embodiment can be used in a terminal, which has capabilities of collecting images and displaying information. The terminal may be a mobile phone, a tablet computer, an e-book reader or an access control monitoring device.

The target object can make various authentication actions before the camera of the terminal using the head of the target object Accordingly, various authentication actions made by the target object using the head may be collected by the terminal. Where various authentication actions include the target authentication action, and may be a facial expression or a head action of the target object, or a combination of the facial expression and the head action of the target object.

In step 302, the action information in the collected image is stored as the reference action information.

Optionally, the terminal may directly store the collected image locally, or may transmit the collected image to the server. The server may store the action information in the received image as the reference action information.

In step 303, prompt information configured to prompt to make a target authentication action is provided to an authentication object, where the target authentication action includes a facial expression and/or a head action.

In a case that the identity authentication is required to be performed on the authentication object, the terminal may provide the prompt information configured to prompt the authentication object to make the target authentication action to the authentication object.

Optionally, step 303 may include any one of two possible implementations as follows.

In a first implementation, the prompt information is provided to the authentication object randomly; where the prompt information corresponds to at least one authentication action.

As a first possible implementation, after the terminal obtains the reference action information, for the authentication action corresponding to the reference action information, the terminal may generate the prompt information for prompting the authentication object to make the authentication action, and stores the generated prompt information.

Thereafter, in a case that the identity authentication is required, the terminal selects randomly one piece of the prompt information from the pre-stored prompt information and provides the selected prompt information to the authentication object. The prompt information may be a target image including the target authentication action or voice information configured to prompt to make the target authentication action.

Optionally, the prompt information has a one-to-one correspondence with the authentication action.

In a second implementation, the target authentication action is acquired randomly from multiple authentication actions; the prompt information is generated based on the target authentication action; and the prompt information is provided to the authentication object.

As a second possible implementation, the terminal may determine the authentication actions based on the obtained reference action information, and store the determined authentication actions. Thereafter, in a case that the identity authentication is required to be performed on the authentication object, the terminal selects randomly the target authentication action from the pre-stored authentication actions, generates the prompt information based on the selected target authentication action and provides the prompt information to the authentication object. Optionally, the prompt information may be a target image including the target authentication action or voice information configured to prompt to make the target authentication action.

It should be illustrated that, the step of the terminal providing the prompt information to the authentication object may include two possible implementations as follows.

In a first implementation, the target image including the target authentication action is displayed. The target image may be an image in which the target authentication action is made by the target object or a cartoon image including the target authentication action made by a cartoon character, which is not limited in the present embodiment.

In a second implementation, voice information configured to prompt to make the target authentication action is played. For example, the terminal may play voice information "please lower your head for authentication".

It should be further noted that, in a case that the terminal can perform the identity authentication on multiple authentication objects, the terminal may firstly receive a user identifier entered by the authentication object, and then provide the prompt information corresponding to the user identifier to the authentication object.

Optionally, the terminal may directly provide the prompt information, in a case that the prompt information is an image represented by a cartoon image or the prompt information is the voice information.

In step 304, at least one frame of image is collected.

The terminal may be provided with a camera, the terminal collects at least one frame of image through the camera. The at least one frame of image may be a single frame of image or a video.

In step 305, it is detected whether authentication action information of the user in the at least one frame of image matches reference action information generated by the user making the target authentication action.

Optionally, the terminal may perform an image recognition on the at least one frame of image to recognize the head information of the authentication object in the image (the recognized information is the authentication action information of the authentication object), and then the terminal detects the similarity between the recognized information and the reference action information.

Optionally, in a case that the collected at least one frame of image includes two or more frame of images and the reference action information includes two or more pieces of reference action information, for each frame of image, the terminal calculates the similarity between the frame of image and each piece of the reference action information, and takes the greatest similarity as the similarity between the frame of image and the reference action information.

Optionally, in a case that the collected at least one frame of image includes two or more frame of images and the reference action information includes two or more pieces of reference action information, for each frame of image, the terminal calculates the similarity between the frame of image and one piece of the reference action information of multiple pieces of the reference action information based on a time order, and takes the calculated similarity as the similarity between the frame of image and the reference action information.

In step 306, it is determined that the user passes the identity authentication in a case that the authentication action information of the user matches the reference action information.

If the terminal detects that the authentication action information of the authentication object matches the reference action information, it means that the authentication object makes correct action according to the prompt information after the terminal provides the prompt information. In this case, the terminal may determine that the authentication object is a user with a usage right, not a photo or video or a user without the usage right, so that the authentication object can pass the identity authentication in the terminal.

Otherwise, if a detection result of the terminal indicates that the authentication action information of the authentication object does not match the reference action information, it means that the authentication object is different from the target object, and the authentication object is a user without the usage right, or is a photo or a video. In this case, the terminal can determine that the authentication object fails to pass the identity authentication. Optionally, the terminal may also display authentication failure information, and prompt the authentication object to perform the identity authentication again, which is not limited by the present embodiment.

In view of the above, in the identity authentication method according to the embodiment, prompt information configured to prompt an authentication object to make a target authentication action is provided to the authentication object when performing the identity authentication. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the user is required in the process of the identity authentication, thereby improving the accuracy of the identity authentication on the user.

In the present embodiment, the prompt information is provided to the authentication object randomly, so that the authentication object may pass the identity authentication only after the authentication object makes the correct authentication action, criminals can not pass the identity authentication using a stolen photo of the target object, thereby improving the accuracy of the identity authentication.

Figure 4:
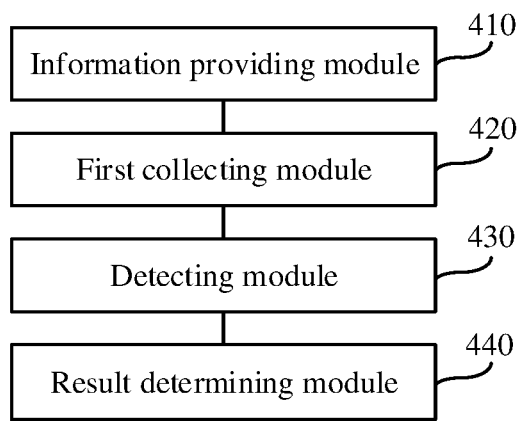
FIG. 4 is a structural block diagram of an identity authentication device according to an embodiment of the present disclosure.

Reference is made to FIG. 4, which is a structural block diagram of an identity authentication device according to an embodiment of the present disclosure. The identity authentication device may include an information providing module 410, a first collecting module 420, a detecting module 430 and a result determining module 440. The information providing module 410 is configured to provide an authentication object with prompt information configured to prompt the authentication object to make a target authentication action, where the target authentication action includes a facial expression and/or a head action. The first collecting module 420 is configured to collect at least one frame of image. The detecting module 430 is configured to detect whether authentication action information of the authentication object in the at least one frame of image matches reference action information generated by a target object making the target authentication action. The result determining module 440 is configured to determine that the authentication object passes an identity authentication in a case that a detection result of the detecting module 430 indicates that the authentication action information of the authentication object matches the reference action information.

In view of the above, in the identity authentication device according to the embodiment, prompt information configured to prompt an authentication object to make a target authentication action is provided to the authentication object when performing the identity authentication. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the user is required in the process of the identity authentication, thereby improving the accuracy of the identity authentication on the user.

Figure 5:
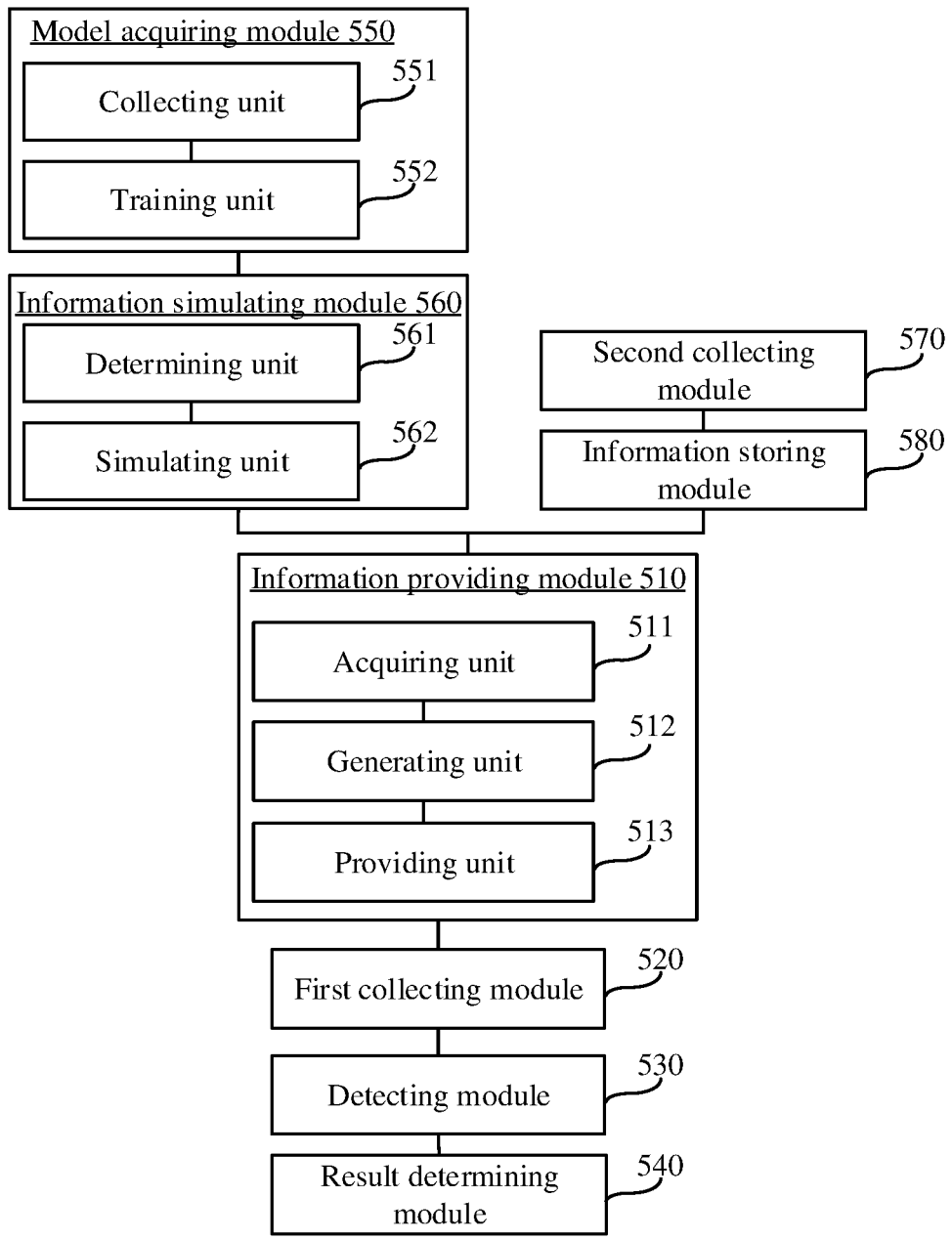
FIG. 5 is a structural block diagram of an identity authentication device according to an embodiment of the present disclosure.

Reference is made to FIG. 5, which is a structural block diagram of an identity authentication device according to an embodiment of the present disclosure. The identity authentication device may include an information providing module 510, a first collecting module 520, a detecting module 530 and a result determining module 540. The information providing module 510 is configured to provide an authentication object with prompt information configured to prompt the authentication object to make a target authentication action, where the target authentication action includes a facial expression and/or a head action. The first collecting module 520 is configured to collect at least one frame of image. The detecting module 530 is configured to detect whether authentication action information of the authentication object in the at least one frame of image matches reference action information generated by a target object making the target authentication action. The result determining module 540 is configured to determine that the authentication object passes an identity authentication in a case that a detection result of the detecting module 530 indicates that the authentication action information of the authentication object matches the reference action information.

Optionally, the information providing module 510 is further configured to provide the prompt information to the authentication object randomly, where the prompt information corresponds to at least one authentication action. Optionally, the prompt information has a one-to-one correspondence with the authentication action.

Optionally, the information providing module 510 includes: an acquiring unit 511, configured to acquire the target authentication action randomly from multiple authentication actions; a generating unit 512, configured to generate the prompt information based on the target authentication action; and a providing unit 513, configured to provide the prompt information to the authentication object.

Optionally, the identity authentication device further includes: a model acquiring module 550, configured to acquire a three-dimensional head model of the target object; and an information simulating module 560, configured to obtain the reference action information generated by the target object making the target authentication action by simulating based on the three-dimensional head model and a preset moving trajectory corresponding to a head during the head moving, where the reference action information is represented by an image and/or a feature point.

Optionally, the model acquiring module 550 includes: a collecting unit 551, configured to collect images including the head of the target object at different angles; and a training unit 552, configured to obtain the three-dimensional head model by training based on the collected images.

Optionally, the information simulating module 560 includes: a determining unit 561, configured to determine feature points of the head of the target object based on the three-dimensional head model; and a simulating unit 562, configured to obtain the reference action information by simulating based on the feature points and the preset moving trajectory.

Optionally, the identity authentication device further includes: a second collecting module 570, configured to collect an image of a head of the target object making the target authentication action; and an information storing module 580, configured to store action information in the collected image as the reference action information.

In view of the above, in the identity authentication device according to the embodiment, prompt information configured to prompt an authentication object to make a target authentication action is provided to the authentication object when performing the identity authentication. It is determined that the authentication object passes the identity authentication only in a case that the authentication object makes an action matched with the target authentication action. In this way, the technical solution in the disclosure addresses the issue that a photo or video may pass the identity authentication, resulting in a low accuracy of the identity authentication in the terminal. The real-time participation of the user is required in the process of the identity authentication, thereby improving the accuracy of the identity authentication on the user.

In the present embodiment, the prompt information is provided to the authentication object randomly, so that the authentication object may pass the identity authentication only after the authentication object makes the correct authentication action, criminals can not pass the identity authentication using a stolen photo of the target object, thereby improving the accuracy of the identity authentication.

Further, in the present embodiment, the authentication action is simulated through the head three-dimensional model. Therefore even the target object does not know the specific content of the authentication action before performing the identity authentication, thus improving the unpredictability of the authentication action and the accuracy of the identity authentication.

It should be noted that, the division of the function modules is only for illustrative purpose when describing the identity authentication performed by the identity authentication device according to the embodiment described above. In actual implementation, the above-mentioned functions may be distributed to different function modules as required. That is, the internal structure of the device is divided into different function modules, so as to complete all or parts of the function described above. In addition, the device embodiment for the identity authentication device described above and the method embodiment for the identity authentication method are covered by the same inventive concept, and the specific implements for the device embodiment may be referred to the method embodiment, which is not discussed with details herein.

Figure 6:
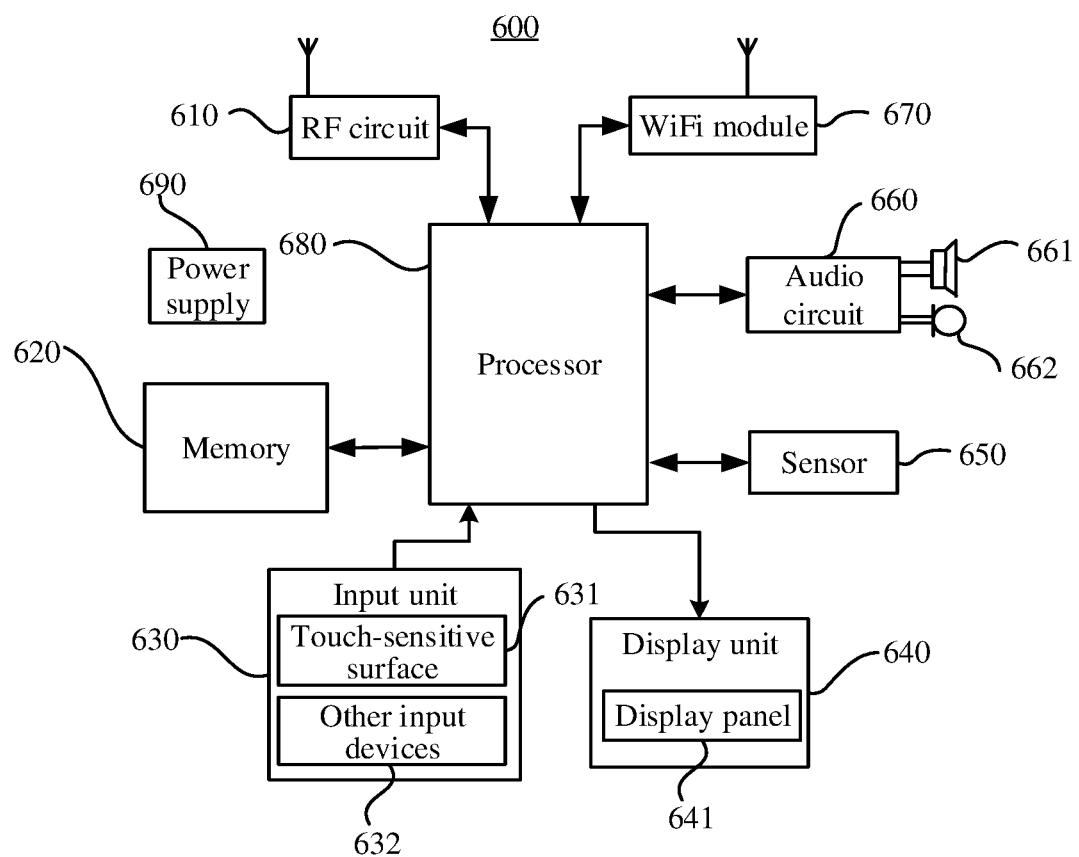
FIG. 6 is a structural block diagram of a terminal according to an embodiment of the present disclosure.

Reference is made to FIG. 6, which is a structural block diagram of a terminal according to an embodiment of the present disclosure. The terminal can implement the identity authentication method according to the embodiment described above.

The terminal 600 may include an RF (Radio Frequency) circuit 610, a memory 620 which includes one or more computer-readable storage media, an input unit 630, a display unit 640, a sensor 650, an audio circuit 660, a WiFi (wireless fidelity) module 670, a processor 680 which includes one or more processing cores and a power supply 690, etc. It will be understood by those skilled in the art that the terminal is not limited to the structure shown in FIG. 6. The terminal may include more components, or fewer components, or some combination of the components, or a different arrangement of the components.

The RF circuit 610 may be configured to, in process of receiving and sending information or making a call, receive and transmit signals, and in particular to transmit downlink information to one or more processors 680 after the downlink information is received from a base station, and transmit data related to uplink to the base station. Generally, the RF circuit 610 includes, but is not limited to, an antenna, at least one amplifier, a tuner, one or more oscillators, a subscriber identity module (SIM) card, a transceiver, a coupler, an LNA (Low Noise Amplifier), a duplexer or the like. In addition, the RF circuit 610 may also communicate with the network and other devices through wireless communication. The wireless communication may be performed by using any communications standard or protocol including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service) or the like.

The memory 620 may be configured to store software programs and modules, which may be executed by the processor 680 to execute various function applications and data processing. The memory 620 may mainly include a program storage region and a data storage region. The program storage region may store an operating system, an application required by at least one function (such as a sound play function, an image play function), or the like. The data storage region may store data (such as audio data, a phone or the like) created based on the using of the terminal 600. In addition, the memory 620 may include a high-speed random access memory, and may further include a non-volatile memory, such as at least one magnetic disk storage device, a flash memory device, or other volatile solid state memory device. Accordingly, the memory 620 may further include a memory controller to provide access for the processor 680 and the input unit 630 to the memory 620.

The input unit 630 may be configured to receive inputted digital or character information, and to generate a keyboard signal input, a mouse signal input, an operating rod signal input, an optical signal input or a track ball signal input that are related to user settings and function control. Specifically, the input unit 630 may include a touch-sensitive surface 631 and other input devices 632. The touch-sensitive surface 631, also referred as a touch display screen or a touch pad, may collect touch operations of a user on the touch-sensitive surface 631 or near the touch-sensitive surface 631 (such as operations of the user performed by any suitable objects or accessories such as a finger, a stylus on or near the touch-sensitive surface 631), and drive a corresponding connection device according to a preset program. Optionally, the touch-sensitive surface 631 may include a touch detection device and a touch controller. The touch detection device detects a touch orientation of a user, detects signals caused by the touch operation, and transmits the signals to the touch controller. The touch controller receives the touch information from the touch detection device, converts the touch information into coordinates of the touch point, then transmits the coordinates to the processor 680, and receives commands from the processor 680 and executes the commands. In addition, the touch-sensitive surface 631 can be realized by various touch-sensitive technical types, such as resistive type, capacitive type, infrared light type and surface acoustic wave type. In addition to the touch-sensitive surface 631, the input unit 630 may also include other input devices 632. Specifically, other input devices 632 may include but are not limited to one or more of a physical keyboard, a function key (such as a volume control button, a switch button, etc.), a track ball, a mouse, an operating rod or the like.

The display unit 640 may be configured to display information inputted by a user or information provided to the user or various graphical user interfaces of the terminal 600, and these graphical user interfaces may include graphics, texts, icons, videos and any combination thereof. The display unit 640 may include a display panel 641. Optionally, the display panel 641 may be configured in the form of an LCD (Liquid Crystal Display), an OLED (Organic Light-Emitting Diode) or the like. Further, the touch-sensitive surface 631 may cover the display panel 641. After a touch operation on or near the touch-sensitive surface 631 is detected, the touch operation is transmitted to the processor 680 to determine the type of a touch event, and then the processor 680 provides a corresponding visual output on the display panel 641 based on the type of the touch event. Although the touch-sensitive surface 631 and the display panel 641 are two separate components to realize an input function and an output function in FIG. 6, in some embodiments, the touch-sensitive surface 631 may be integrated with the display panel 641 to realize the input function and output function.

The terminal 600 may also include at least one sensor 650, such as a light sensor, a motion sensor and other sensors. Specifically, the light sensor may include an ambient light sensor and a proximity sensor. The ambient light sensor may adjust the brightness of the display panel 641 based on the brightness of the ambient light, and the proximity sensor may close the display panel 641 and/or back light, when the terminal 600 is moved near the ear. As a kind of motion sensor, a gravity acceleration sensor may detect the magnitude of acceleration in all directions (typically three axis), and may detect the magnitude and direction of gravity when the gravity acceleration sensor is at rest. The gravity acceleration sensor may be applied to applications of identifying mobile phone gesture (such as horizontal/vertical screen switching, related games, magnetometer attitude calibration), vibration identification related functions (such as a pedometer, a tap). Other sensors such as a gyroscope, a barometer, a hygrometer, a thermometer, an infrared sensor that can be provided in the terminal 600 are not described herein.

The audio circuit 660, a speaker 661, and a microphone 662 may provide an audio interface between a user and the terminal 600. The audio circuit 660 may transmit a received electrical signal into which audio data is converted, to the speaker 661, and the speaker 661 converts the electrical signal into a sound signal and outputs the sound signal. On the other hand, the microphone 662 converts the collected sound signal into the electrical signal, the audio circuit 660 receives the electrical signal and converts the electrical signal into the audio data. The audio data is outputted to the processor 680 to be processed, the processed audio data is transmitted to another terminal through the RF circuit 610, or the audio data is outputted to the memory 620 for further processing. The audio circuit 660 may further include a headset jack, which is configured to provide communication between the terminal 600 and a peripheral headset.

WiFi is a short-range wireless transmission technology, the terminal 600 may help users send and receive an e-mail, browse a web and access to streaming media through the WiFi module 670. The WiFi module 670 provides users with wireless broadband Internet access. Although FIG. 6 shows the WiFi module 670, it should be understood that the WiFi module 670 does not belong to the essential configuration of the terminal 600 and may be omitted without departing from the essence of the disclosure as needed.

The processor 680 is a control center of the terminal 600, which connects each part of the mobile phone with various interfaces and lines. By operating or executing the software programs and/or modules stored in the memory 620 and invoking the data stored in the memory 620, various functions and data processing of the terminal 600 are performed, thus monitoring the mobile phone. Optionally, the processor 680 may include one or more processing cores. Preferably, the processor 680 may integrate an application processor and a modem processor, where the application processor mainly processes an operating system, a user interface, an application or the like, and the modem processor mainly processes wireless communications. It should be understood that, the above-described modem processor may not be integrated into the processor 680.

The terminal 600 further includes a power supply 690 (such as a battery) for supplying power to the multiple components. Preferably, the power supply may be logically connected to the processor 680 through a power management system, so as to achieve a charging management function, a discharging management function and a power consumption management function through a power supply management system. The power supply 690 may also include any one or more components, such as a DC power supply or an AC power supply, a recharge system, a power failure detection circuit, a power converter or inverter, a power supply status indicator and the like.

Although not shown, the terminal 600 may also include a camera, a Bluetooth module and the like, which are not described herein. Specifically, in this embodiment, the display unit of the terminal 600 is a touch screen display. The terminal 600 further includes a memory and one or more programs which are stored in the memory and executed by one or more processors. The one or more programs include instructions for performing each of the operations in the above identity authentication method.

In the exemplary embodiments, a non-temporal computer-readable storage medium including instructions is provided, such as a memory including instructions which may be executed by a processor of a terminal to perform the above identity authentication method in embodiments shown in FIG. 2A or FIG. 3. For example, the non-temporal computer-readable storage medium may be an ROM (Read-Only Memory), an RAM (Random-Access Memory), a CD-ROM (Compact Disc Read-Only Memory), a magnetic tape, a floppy disk and an optical data storage device or the like.

Serial numbers of the embodiments are only for illustration, merits of the embodiments may not be reflected by the serial numbers.

Those of ordinary skilled in the art may understand that all or part of the steps achieving the above embodiment may either be carried out by hardware or be carried out by relevant hardware instructed by programs. The programs may be stored in a computer readable storage media. The aforementioned storage media may be a read only memory, a magnetic disk, an optical disk or the like.

What is described above is only the preferred embodiments of the present disclosure and are not intended to define the present disclosure. Any changes, equivalent substitution, improvement and so on made within the spirit and principles of the present disclosure are all contained in the protection scope of the present disclosure.

The invention claimed is:

1. An identity authentication method, comprising:
providing an authentication object with prompt information, wherein the prompt information is used to prompt the authentication object to make a target authentication action, wherein the target authentication action comprises at least one of a facial expression and a head action;

collecting at least one frame of image;
detecting whether authentication action information of the authentication object in the at least one frame of image matches reference action information, wherein the reference action information is information generated when a target object makes the target authentication action;
determining that the authentication object passes an identity authentication in a case that the authentication action information of the authentication object matches the reference action information;
acquiring a three-dimensional head model of the target object; and
obtaining the reference action information generated when the target object makes the target authentication action by simulating based on the three-dimensional head model and a preset moving trajectory corresponding to a head during the head moving, wherein the reference action information is represented by at least one of an image and a feature point.

2. The identity authentication method according to claim 1, wherein the providing the authentication object with the prompt information comprises:
providing the prompt information to the authentication object randomly, wherein the prompt information corresponds to at least one authentication action.

3. The identity authentication method according to claim 1, wherein the providing the authentication object with the prompt information comprises:
acquiring the target authentication action randomly from a plurality of authentication actions;
generating the prompt information based on the target authentication action; and
providing the prompt information to the authentication object.

4. The identity authentication method according to claim 1, wherein the acquiring the three-dimensional head model of the target object comprises:
collecting images comprising the head of the target object at different angles; and
obtaining the three-dimensional head model by training based on the collected images.

5. The identity authentication method according to claim 1, wherein the obtaining the reference action information generated when the target object makes the target authentication action by simulating based on the three-dimensional head model and the preset moving trajectory corresponding to the head during the head moving comprises:
determining feature points of the head of the target object based on the three-dimensional head model; and
obtaining the reference action information by simulating based on the feature points and the preset moving trajectory.

6. The identity authentication method according to claim 1, further comprising:
collecting an image of a head of the target object making the target authentication action; and
storing action information in the collected image as the reference action information.

7. An identity authentication device, comprising:
an information providing module, configured to provide an authentication object with prompt information, wherein the prompt information is used to prompt the authentication object to make a target authentication action, wherein the target authentication action comprises at least one of a facial expression and a head action;
a first collecting module, configured to collect at least one frame of image;
a detecting module, configured to detect whether authentication action information of the authentication object in the at least one frame of image matches reference action information, wherein the reference action information is information generated when a target object makes the target authentication action;
a result determining module, configured to determine that the authentication object passes an identity authentication in a case that a detection result of the detecting module indicates that the authentication action information of the authentication object matches the reference action information;
a model acquiring module, configured to acquire a three-dimensional head model of the target object; and
an information simulating module, configured to obtain the reference action information generated when the target object makes the target authentication action by simulating based on the three-dimensional head model and a preset moving trajectory corresponding to a head during the head moving, wherein the reference action information is represented by at least one of an image and a feature point.

8. The identity authentication device according to claim 7, wherein the information providing module is further configured to:
provide the prompt information to the authentication object randomly, wherein the prompt information corresponds to at least one authentication action.

9. The identity authentication device according to claim 7, wherein the information providing module comprises:
an acquiring unit, configured to acquire the target authentication action randomly from a plurality of authentication actions;
a generating unit, configured to generate the prompt information based on the target authentication action; and
a providing unit, configured to provide the prompt information to the authentication object.

10. The identity authentication device according to claim 7, wherein the model acquiring module comprises:
a collecting unit, configured to collect images comprising the head of the target object at different angles; and
a training unit, configured to obtain the three-dimensional head model by training based on the collected images.

11. The identity authentication device according to claim 7, wherein the information simulating module comprises:
a determining unit, configured to determine feature points of the head of the target object based on the three-dimensional head model; and
a simulating unit, configured to obtain the reference action information by simulating based on the feature points and the preset moving trajectory.

12. The identity authentication device according to claim 7, further comprising:
a second collecting module, configured to collect an image of a head of the target object making the target authentication action; and
an information storing module, configured to store action information in the collected image as the reference action information.

13. A terminal, comprising:
one or more processors; and
a memory stored with one or more programs configured to be executed by the one or more processors, wherein the one or more programs comprise an instruction to:

provide an authentication object with prompt information, wherein the prompt information is used to prompt the authentication object to make a target authentication action, wherein the target authentication action comprises at least one of a facial expression and a head action;

collect at least one frame of image;

detect whether authentication action information of the authentication object in the at least one frame of image matches reference action information, wherein the reference action information is information generated when a target object makes the target authentication action;

determine that the authentication object passes an identity authentication in a case that the authentication action information of the authentication object matches the reference action information;

acquire a three-dimensional head model of the target object; and obtain the reference action information generated when the target object makes the target authentication action by simulating based on the three-dimensional head model and a preset moving trajectory corresponding to a head during the head moving, wherein the reference action information is represented by at least one of an image and a feature point.

14. The terminal according to claim 13, wherein the one or more programs further comprise an instruction to:

provide the prompt information to the authentication object randomly, wherein the prompt information corresponds to at least one authentication action.

15. The terminal according to claim 13, wherein the one or more programs further comprise an instruction to:

acquire the target authentication action randomly from a plurality of authentication actions;

generate the prompt information based on the target authentication action; and provide the prompt information to the authentication object.

16. The terminal according to claim 13, wherein the one or more programs further comprise an instruction to:

collect images comprising the head of the target object at different angles; and obtain the three-dimensional head model by training based on the collected images.

17. The terminal according to claim 13, wherein the one or more programs further comprise an instruction to:

determine feature points of the head of the target object based on the three-dimensional head model; and obtain the reference action information by simulating based on the feature points and the preset moving trajectory.

18. The terminal according to claim 13, wherein the one or more programs further comprise an instruction to:

collect an image of a head of the target object making the target authentication action; and store action information in the collected image as the reference action information.

* * * * *